United States Patent Office 3,441,487
Patented Apr. 29, 1969

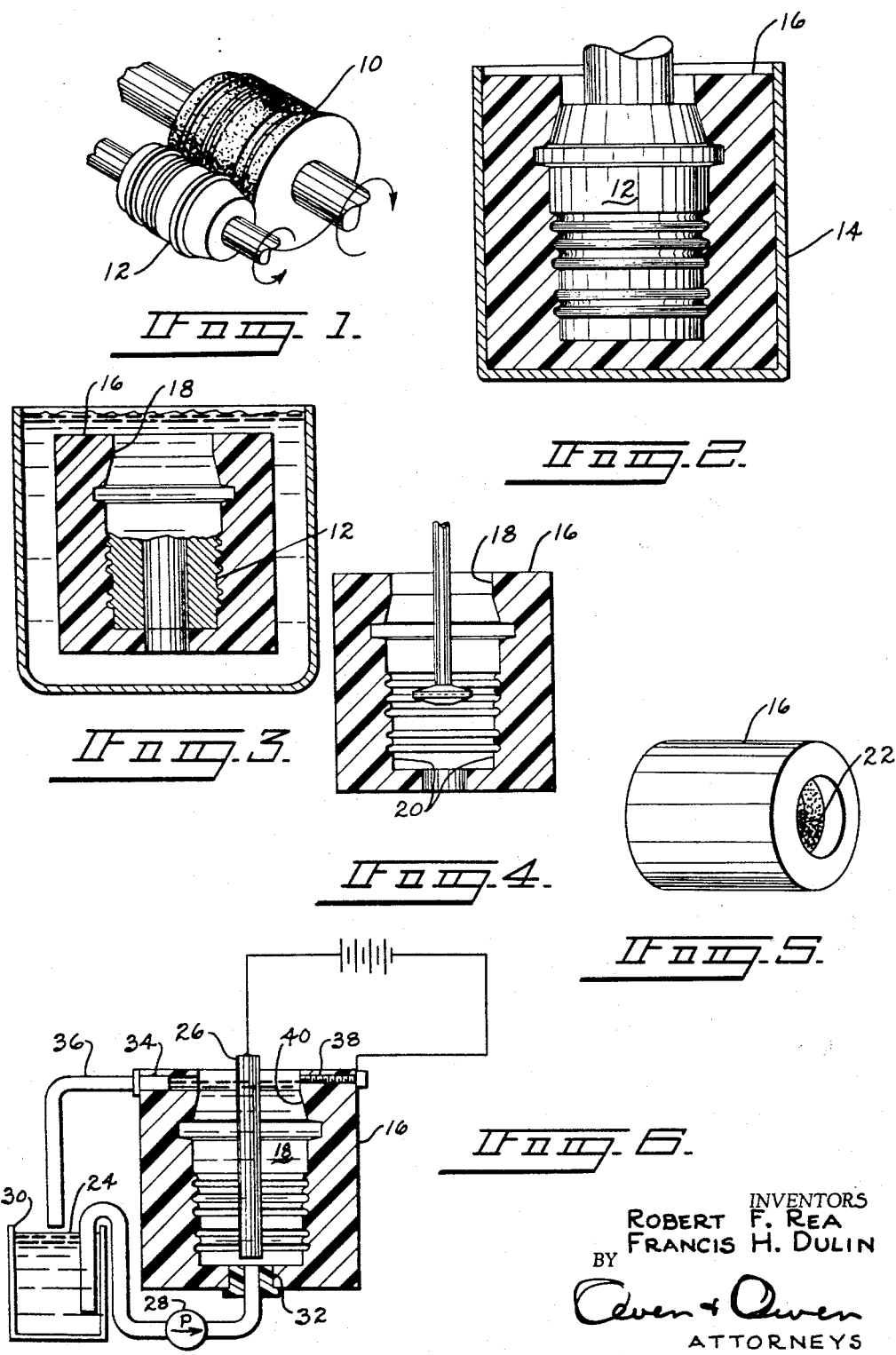

3,441,487
METHOD OF ACCURATELY PRODUCING AN ABRASIVE SURFACE OF REVOLUTION
Robert F. Rea, Bloomfield Hills, and Francis H. Dulin, Rochester, Mich., assignors to Champion Spark Plug Company, Toledo, Ohio, a corporation of Delaware
Continuation of application Ser. No. 231,099, Oct. 17, 1962. This application May 13, 1966, Ser. No. 549,970
Int. Cl. C23b 7/00
U.S. Cl. 204—6                                         11 Claims

ABSTRACT OF THE DISCLOSURE

A method of bonding hard abrasive particles of a generally uniform predetermined size to a supporting structure which includes the steps of: applying to a surface of a forming body which surface has a predetermined contour, a uniform layer of an electrically conductive paint containing, to impart conductivity, a material having an electrical resistance substantially as low as silver and being substantially as resistant to corrosion as silver, the electrically conductive paint being applied in a uniform layer to a thickness less than one half of the predetermined size of the particles, embedding abrasive particles through the paint in contact with the surface of the forming body having the predetermined contour while the paint is still tacky, electrodepositing metal over the paint and particles to grip the particles, introducing a hardenable material in contact with the electrodeposited metal to form a supporting structure, and separating the forming body from the paint.

---

The present invention relates to an improved and inexpensive method of making an abrasive tool wherein the apexes of all of its abrasive particles are precisely positioned in predetermined configurations; and more particularly to such tools formed as surfaces of revolution, and is a continuation of U.S. patent application Ser. No. 231,099, filed Oct. 17, 1962, and now abandoned.

A problem has existed heretofore in the making of grinding wheel dressers and the like in exact configurations when the apexes of all its abrasive granules lies in the exact configuration that is desired to be produced. One type of tool in which we are particularly interested is a diamond dresser that is used in dressing grinding wheels to complicated configurations. Where a diamond dresser is to be produced having a flat annular area the prior art in one instance has coated a flat surface with an adhesive, sprinkled diamond particles of generally uniform size thereon, and then rolled or pressed the diamond particles through the adhesive up against the surface of the form. One major difficulty of this method of making diamond dressers is that it can only be used where flat surfaces are to be produced and, second, minor irregularities may be produced because of the differences in particle size which are inherent in any screening or sizing operations of the diamond particles.

Where diamond dressers of the type having surfaces of revolution have been produced, the prior art has customarily formed the dressers by manually inserting particles of diamond upon a rotor member having the general configuration desired. In this manner the diamond particles are accurately positioned so that their apexes project the desired amount out of the surface of the rotary dresser body. Still other methods have been suggested and attempted, but in general all of the methods which have been used heretofore are not entirely satisfactory and will, in many instances, have diamond particles which project further out of the surface of the dresser than do the remaining particles so that the grinding wheels produced therefrom have undesired grooves in their surfaces.

An object of the present invention is the provision of a new and improved method of making a diamond dresser, and in particular a rotary diamond dresser which is simple, inexpensive to carry out, and which will produce a rotary dresser having abrasive particles—the apexes of which all lie in the desired surface configuration.

Further objects and advantages of the present invention will become apparent to those skilled in the art to which it relates from the following description of the preferred method of carrying out the invention which is described with reference to the accompanying drawings forming a part of the specification, and in which:

FIG. 1 is an isometric view of a contoured grinding wheel being turned against a metal blank to impart its configuration upon or to the metal blank;

FIG. 2 shows a form being cast around the contoured metal blank;

FIG. 3 shows a liquid bath treatment for dissolving the metal blank;

FIG. 4 shows a spraying operation for applying an electrically conductive paint on the inside contour of the mold;

FIG. 5 depicts a method of applying abrasive particles to the painted surface of the mold;

Figure 7:
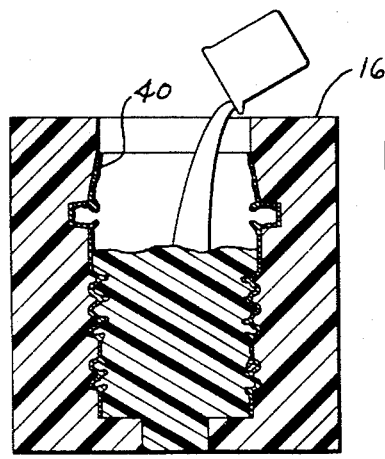
Figure 8:
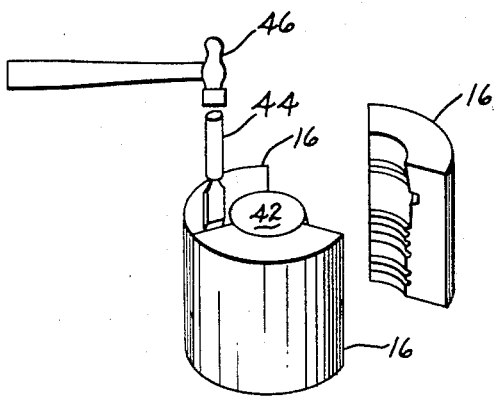
Figure 9:
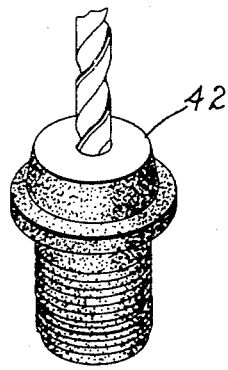
Figure 10:
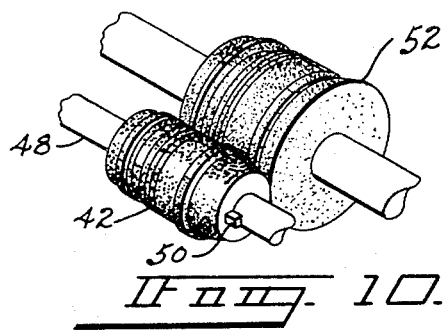
Figure 11:
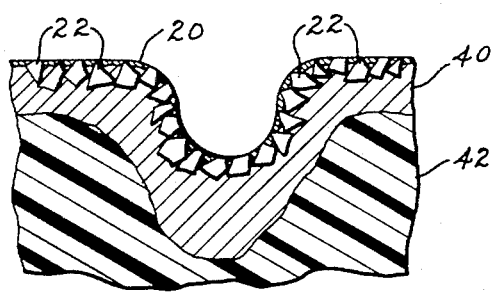

FIG. 6 schematically illustrates equipment for electroplating a metal on top of the electrically conductive paint;

FIG. 7 shows the mold being filled with a hardenable material which bonds to the electrically deposited metal;

FIG. 8 schematically depicts a process of removing the mold material from the outer surface of the abrasive coated body formed in FIG. 7;

FIG. 9 schematically illustrates the operation of drilling out the dresser body for the reception of its shaft;

FIG. 10 illustrates the use of the finished dresser for the contouring of a grinding wheel; and FIG. 11 is a fragmentary cross sectional view through a portion of the surface of the finished dresser to better illustrate its construction.

In the preferred method of carrying out the invention which is depicted in the drawings, the process is started with a grinding wheel which has been contoured to give the desired shape of finished part. By so doing a part can be ground by the grinding wheel, and from the actual surface of said ground part, as observed in an optical comparator etc., a determination can be made of changes that might be necessary in the contouring of the grinding wheel to produce the exact desired configuration of the finished part. Once a grinding wheel has been contoured to give the exact configuration of the finished part that is desired, the grinding wheel is run against a blank of material which can be suitably decomposed as will later be explained.

In the preferred embodiment shown in the drawings, a metal blank is used and, in particular, a blank made from aluminum. The metal blank is thereafter placed in a container 14, and a suitable material cast around the blank to provide an internal cavity whose surface exactly duplicates that of the desired finished rotary diamond dresser. The cast material which is used to surround the blank and thereby make a mold may be of any suitable type which will not be deteriorated by the process which is later used to remove the metal blank. Where aluminum is used for the metal blank an epoxy resin can be used to make the mold, and in order to reduce shrinkage and temperature changes of the epoxy resin a filler of another material, such as metal, is preferably added. One material which has given excellent results comprises a mixture of approximately 25 parts by weight of an epoxy resin-hardener mixture, 75 parts by weight of a copper powder smaller than approximately 100 mesh.

The blank 12 may be decomposed within the cast body 16 in any suitable manner, so long as the manner used will not produce a deterioration of the cast body 16. It will be apparent that various combinations of materials, and methods of removal of the blank 12 can be used. In the preferred embodiment shown in the drawing, wherein the blank 12 is made from aluminum and the cast body 16 is made from an epoxy resin, the aluminum body 12 is preferably removed from the epoxy resin body 16 by means of a sodium hydroxide solution of an appropriate strength, as for example 20%, which readily dissolves the aluminum without attacking the epoxy resin cast body 16.

The internal chamber 18 in the cast body 16 that is exposed by the dissolving away of the aluminum is then sprayed with an electrically conductive paint which uniformly coats the surface of the internal chamber 18 with a thin layer of tacky material. Prior to spraying with paint all those surfaces including the bottom of the mold which are not to be coated with abrasive particles are masked with a suitable masking tape. This tape is removed after the paint has dried. While any electrically conductive paint may be utilized, paints containing powdered silver as a pigment have been found to give excellent results since they are very good conductors and can be applied in a very thin coating to provide the desired electrical conductivity. Paints having the following general composition have been purchased commercially and used:

| | Percent [1] |
|---|---|
| Finely divided silver | 60–65 |
| Organic resin binder such as butyl methacrylate | 2–6 |
| Solvent such as ethylene glycol monobutyl ether, or diethylene glycol monobutyl ether acetate | 29–38 |

[1] All by weight.

The thickness of the layer of paint that is applied can vary appreciably. Where particles of abrasive approximately 120 mesh size are to be used, a paint thickness of between 0.0005 to 0.003 inch is preferable; where particles of approximately 50 mesh size are to be used, a paint thickness of between 0.001 and 0.006 inch is preferable; and where particles greater than about 20 mesh size are to be used, a paint thickness of between 0.002 and 0.008 inch is preferable. The above thicknesses are measured after drying.

After the electrically conductive paint 20 is applied to the surface 18, and while the paint is still in its wet or tacky condition, abrasive particles 22, and in the present instance diamond particles, are poured into the internal chamber 18 of the mold. The mold is laid on its side and the abrasive particles are pressed down into the paint, as by a rubber finger, so that the apexes, faces, or edges of the abrasive particles project all the way through the layer of paint to the surface of the internal chamber 18 as shown in FIG. 11. The mold body 16 is slowly revolved and the diamond particles pressed in place until all of its surfaces, including its projections and indentations, have been covered with the abrasive particles in the manner as shown in FIG. 11. Thereafter the remaining diamond particles are poured out of the mold 16, and the mold 16 is shaken to remove any loose abrasive particles that may have remained. This procedure assures that the apexes of all of the abrasive particles 22 lie in the desired surface configuration such that no grooves will be formed in the grinding wheels that will later be contoured by these particles.

After the paint has dried, a suitable metal is electrically deposited around the abrasive particles to hold the abrasive particles 22 in place. This can be done in any suitable manner, and as shown in the drawing, is accomplished by placing a metal electrode 26 in the center of the cavity 18 and circulating an electroplating solution through the cavity. Circulation of the electroplating solution is conveniently accomplished by means of a pump 28 whose suction is connected to a pail 30 which contains a supply of the electroplating solution and which also may contain suitable filter material to remove any foreign debris, as well as a thermostatically controlled heater. The discharge from the pump 28 may be connected to an opening 32 in the bottom of the mold 16 leading to the center of the cavity 18. The top part of the mold body 16 may be similarly provided with an outlet opening 38 in its region above its contoured surface for the reception of a discharge pipe 36 leading to the pail 30. The rate of circulation from the pump 26 can be adjusted to provide a suitable flow which overflows through the pipe 36 to the pail 30.

The center electrode 26 is made the anode of a direct current circuit having the desired voltage, and the painted surface 20 is made the cathode of the electrical circuit by means of a threaded bolt 38 which extends through the body 16 into contact with the painted layer 20. The DC voltage of the circuit is preferably adjusted to give an initial current density of from between 3 to 10 amperes per square foot on the cathode, and after several hours of plating at this density the voltage is preferably raised to give a final current density of approximately 80 amperes per square foot. The electrodeposited layer can be formed in any suitable manner, using any suitable metal or solution, and in the preferred embodiment a standard nickel sulfamate plating bath is used. Alternatively, the abrasive particles may be held in place by the electrodeposition of copper, iron, or any other strong metal, utilizing any suitable bath or treatment.

Although the thickness of the electrodeposited metal is not critical, we prefer that a minimum of $\frac{1}{32}$ inch of metal be applied over the grain and even greater thicknesses up to $\frac{1}{4}$ inch are more desirable.

In the preferred embodiment a non-uniform thickness of electrodeposited metal is desirable although not necessary. To those skilled in the art of electroforming, it is well known that a non-uniform cathode surface will tend to gather non-uniform thicknesses of metal unless special techniques are employed to make the distribution of applied current more uniform. More uniform thicknesses have been obtained in practice during the initial deposition of metal by using suitable shielding, anode configurations and low current density to improve coverage of abrasive grains at the farthest distance from the anode. However, final deposition at high current densities without special practices develops high metal build up rapidly and in particular develops greater build up at ridges and other areas of locally increased current density. This results in the development of tree-like growths or dendrites radially inward from higher current density regions closer to the anode. These dendrites provide a desirable interlocking bond with the subsequent cast core material.

Following the electroplating step the internal cavity is washed and dried and is then filled with a suitable hardening material which will serve as an adequate support for the electrodeposited layer 40. The material used may be a low melting point metal for example, and in the preferred embodiment shown in the drawings is an epoxy resin because it is strong and inexpensive, has low shrinkage, and can be easily cast in place. A suitable mix which has been used is as follows: 93.72% by weight of a commercial aluminum filled epoxy resin, and 6.28% by weight of a commercial hardener. The filled epoxy comprises 65% by weight of epoxy resin and 35% by weight of aluminum powder −100 mesh. Alternatively the same copper filled epoxy resin that was used to make the mold may be used.

After the dresser body 42 has been cast in place, the hardened outer cast body 16 is removed from the painted surface. This can be done in any suitable manner and, as shown in the drawing, is accomplished by sawing the body at a plurality of points spaced around its periphery, is then easily cracked into a plurality of sections by means of a chisel 44 and hammer 46. It has been found that the electrically conductive paint provides just sufficient bond to hold the diamond particles in place to initiate the electrodeposition of the gripping metal. At the same time the paint acts as a parting agent between the deposited metal and the cast body 16 which will permit an easy separation of the finished dresser from the cast body 16 without removing any of the diamond particles.

After the dresser body 42 has been removed from the cast mold body, it is bored out axially of the dresser body in preparation for the reception of a shaft 48 by means of which the dresser body can be rotatably supported. The shaft 48 and the dresser body may be provided with matching keyways and a key 50 installed to rotatably drive the dresser body. This operation generally completes the formation of the dresser body 42, and it can thereafter be rotated against the surface of a grinding wheel body 52 to impart the desired configuration to the external surface of the grinding wheel 52.

FIG. 11 shows a fragmentary portion of the finished dresser body in cross section to better illustrate the manner in which the diamond particles 22 are substantially completely surrounded and encased by the electrodeposited layer 40. The diamond particles 22 shown in FIG. 11 are all of a generally predetermined size, and the paint layer 20 is of a thickness considerably less than half of the diamond particle size.

While the preferred method of practicing the invention has been described as starting with a grinding wheel which has been contoured to give the desired configuration of finished part, it will in some instances be possible to otherwise contour the blank 12 directly with a configuration that duplicates that of the desired part. This can be done by a shadow graph grinder or a tracer lathe, for example. Thereafter, the part 12 can be placed in a mold, the body 16 cast around the blank 12, and the process continued in the general manner discussed above.

It will be apparent that the objects heretofore enumerated as well as others have been accomplished, and that there has been provided a new and improved method of making grinding wheel dressers which is not only capable of making the more difficult rotary dresser but which is equally adaptable to the making of the less complicated stationary dressers having contoured generally planar surfaces. Inasmuch as the preferred embodiment has now been described in detail, and the general process involved is now understood, it will be apparent that other combinations of model and mold materials, as well as other solutions or methods of removing the model from the mold material, can be utilized. For example, the model of the dresser could be made from calcium carbonate shaped by a shadow graph grinder, the mold could be made of an epoxy resin, and the calcium carbonate model could be dissolved out using a dilute acid. In another embodiment, the model of the dresser could be made of plaster of Paris, the mold made of an epoxy resin, and the model dissolved out with dilute hydrochloric acid. In still another embodiment the dresser could be made of a soft metal and the mold could be made from a synthetic rubber that is vulcanized in place and later physically stripped off of the metal model. In another embodiment a wax model or other material capable of being removed by melting at a low temperature such as a low melting alloy may be used and subsequently melted from the mold which has been cast around said model.

While the invention has been described in considerable detail, we do not wish to be limited to the particular embodiment shown and described, and it is our intention to cover hereby all novel adaptations, modifications or arrangements thereof which come within the practice of those skilled in the art to which the invention relates.

What we claim is:

1. In the process of bonding hard abrasive particles of a generally uniform predetermined size to a supporting structure, the steps of: applying an electrically conductive paint onto a forming body in a uniform layer to a thickness less than one-half of said predetermined size of said particles, said electrically conductive paint containing, to impart conductivity, a material having an electrical resistance substantially as low as silver and being substantially as resistant to corrosion as silver, embedding said abrasive particles through said paint in contact with said forming body while said paint is still tacky, electrodepositing metal over said paint and particles to grip said particles, introducing a hardenable material in contact with said electrodeposited metal to form a supporting structure, and separating said forming body from said paint.

2. In the process of bonding hard abrasive particles of a generally uniform predetermined size to a supporting structure, the steps of: applying a paint containing silver pigment onto a forming body in a uniform layer to a thickness less than one-half of said predetermined size of said particles, embedding said abrasive particles through said paint in contact with said forming body while said paint is still tacky, electrodepositing metal over said paint and particles to grip said particles, introducing a hardenable material in contact with said electrodeposited metal to form a supporting structure, and separating said forming body from said paint.

3. In the process of bonding diamond particles of a generally uniform predetermined size to a supporting structure, the steps of: applying an electrically conductive paint onto a forming body in a uniform layer less than one-half of said predetermined size of said particles, said electrically conductive paint containing, to impart conductivity, a material having an electrical resistance substantially as low as silver and being substantially as resistant to corrosion as silver, embedding said diamond particles through said paint in contact with said forming body while said paint is still tacky, electrodepositing metal over said paint and diamond particles to grip said diamond particles, introducing a hardenable material in contact with said electrodeposited metal to form a supporting structure, and separating said forming body from said paint.

4. A method of producing a dresser of a predetermined configuration comprising: providing a body having a contour on said body which is a positive of the desired contour, providing a mold around the contoured surface of said body to provide a mold having an internal chamber whose surface is a negative of said body, desolidifying said body to remove it from said internal chamber of said mold, applying an electrically conductive paint onto the inside contoured surface of said mold, said electrically conductive paint containing, to impart conductivity, a material having an electrical resistance substantially as low as silver and being substantially as resistant to corrosion as silver, causing abrasive particles to be embedded through said paint to the surface of said mold while said paint is tacky, electrodepositing metal onto said paint around and covering said abrasive particles to form an electrodeposited metal layer which supports the abrasive particles, filling said internal chamber of said mold with a solidifiable material which supports said electrodeposited metal layer and abrasive particles to form a solid rotatable dresser.

5. In a method of producing a diamond dresser having a predetermined configuration, the steps of: providing a contoured body which is a positive of said predetermined configuration, providing a mold around the contoured surface of said body to provide an internal chamber whose surface is a negative of said body, desolidifying said body to remove it from said internal chamber of said mold, applying an electrically conductive paint onto the inside contoured surface of said mold, said electrically conductive paint containing, to impart conductivity, a material having an electrical resistance substantially as low as silver and substantially as resistant to corrosion as silver, causing diamond particles to be embedded through said paint to the surface of said mold while said paint is tacky, electrodepositing metal onto said paint and around and covering said diamond particles to form an electrodeposited metal layer which supports the diamond particles, filling said internal chamber of said mold with a solidifiable material which supports said electrodeposited metal layer and diamond particles to form a solid rotatable dresser.

6. In a method of producing a diamond dresser having a predetermined configuration the steps of: providing a contoured body which is a positive of said predetermined configuration, providing a mold around the contoured surface of said body to provide an internal chamber whose surface is a negative of said body, desolidifying said body to remove it from said internal chamber of said mold, applying an electrically conductive paint onto the inside contoured surface of said mold, said electrically conductive paint containing as the conductive material a silver pigment, causing diamond particles to be embedded through said paint to the surface of said mold while said paint is tacky, electrodepositing metal onto said paint and around and covering said diamond particles to form an electrodeposited metal layer which supports the diamond particles, filling said internal chamber of said mold with a solidifiable material which supports said electrodeposited metal layer and diamond particles to form a solid rotatable dresser.

7. A method of producing a diamond dresser to a predetermined configuration comprising: providing an aluminum body having a contoured surface which is a positive of said desired configuration, providing a mold around said contoured surface of said aluminum body to provide an internal chamber whose surface is a negative of said aluminum body, desolidifying said aluminum body to remove it from said internal chamber of said mold, spraying an electrically conductive paint onto the inside contoured surface of said mold, said electrically conductive paint containing, to impart conductivity, a material having an electrical resistance substantially as low as silver and being substantially as resistant to corrosion as silver, causing diamond particles to be embedded through said paint to said inside contoured surface of said mold while said paint is tacky, removing excess diamond particles from said internal chamber of said mold, drying said paint, electrodepositing metal onto said paint and around and covering said diamond particles to form an electrodeposited metal layer which supports the diamond particles, filling said internal chamber of said mold with a solidifiable material which supports said electrodeposited metal layer and diamond particles to form a solid rotatable diamond dresser.

8. The method of producing a dresser for contouring a grinding wheel to a predetermined configuration comprising: contouring a body to provide an outer surface of revolution on said body which is a negative of said predetermined configuration, providing a mold around said contoured surface of said body to provide an internal chamber whose surface is a negative of said body, desolidifying said body to remove it from said internal chamber of said mold, applying an electrically conductive paint onto the inside contoured surface of said mold, said electrically conductive paint containing, to impart conductivity, a material having an electrical resistance substantially as low as silver and being substantially as resistant to corrosion as silver, causing abrasive particles to be embedded through said paint to the surface of said mold while said paint is tacky, electrodepositing metal onto said paint and around and covering said abrasive particles to form an electrodeposited metal layer which supports the abrasive particles, filling said internal chamber of said mold with a solidifiable material which supports said electrodeposited metal layer and abrasive particles to form a solid rotatable dresser, removing said solid rotatable dresser from said mold, to provide a dresser which when revolved against the revolving surface of a grinding wheel contours its surface to the predetermined configuration.

9. The method of producing a dresser for contouring a grinding wheel to a predetermined configuration comprising: contouring a master grinding wheel to a desired contour, rotating said master grinding wheel, contacting said rotating master grinding wheel with the surface of a disintegratable material body that is rotated at a peripheral speed different from that of said master grinding wheel to provide an outer surface of revolution on said body which is a negative of said desired contour, casting a mold around said contoured surface of said body to provide an internal chamber whose surface is a negative of said body, desolidifying said body to remove it from said internal chamber of said mold, spraying an electrically conductive paint onto the inside contoured surface of said mold, said electrically conductive paint containing, to impart conductivity, a material having an electrical resistance substantially as low as silver and being substantially as resistant to corrosion as silver, causing abrasive particles to be embedded through said paint to said inside contoured surface of said mold while said paint is tacky, removing excess abrasive particles from said internal chamber of said mold, drying said paint, electrodepositing metal onto said paint around and covering said abrasive particles to form an electrodeposited metal layer which supports the abrasive particles, filling said internal chamber of said mold with a solidifiable material which supports an electrodeposited metal layer and abrasive particles to form a solid rotatable dresser and removing said solid rotatable dresser from said mold, to provide a dresser which when revolved against the revolving surface of a grinding wheel contours its surface to the desired contour of said master grinding wheel.

10. The method of producing a dresser for contouring a grinding wheel to a predetermined configuration said dresser comprising hard abrasive particles of a generally uniform predetermined size bonded to a supporting structure, said method comprising: contouring a body to provide an outer surface of revolution on said body which is a negative of said predetermined configuration, casting a mold around said contoured surface of said body to provide an internal chamber whose surface is a negative of said body, desolidifying said body to remove it from said internal chamber of said mold, applying an electrically conductive paint, onto the inside contoured surface of said mold in a uniform layer to a thickness less than one half of said predetermined size of said particles, said electrically conductive paint containing, to impart conductivity, a material having an electrical resistance substantially as low as silver and being substantially as resistant to corrosion as silver, causing abrasive particles to be embedded through said paint to the surface of said mold while said paint is tacky, electrodepositing metal onto said paint and around and covering said abrasive particles to form an electrodeposited metal layer which supports the abrasive particles, filling said internal chamber of said mold with a solidifiable material which supports said electrodeposited metal layer and abrasive particles to form a solid rotatable dresser, removing said solid rotatable dresser from said mold, to provide a dresser which when revolved against the revolving surface of a grinding wheel contours its surface to the predetermined configuration.

11. The method of producing a dresser for contouring a grinding wheel to a predetermined configuration said dresser comprising hard abrasive particles of a generally uniform predetermined size bonded to a supporting structure, said method comprising: contouring a master grinding wheel to the desired contour, rotating said master grinding wheel, contacting said rotating master grinding wheel with the surface of a disintegratable material body that is rotated at a peripheral speed different from that of said master grinding wheel to provide an outer surface of revolution on said body which is a negative of said desired contour, casting a mold around said contoured surface of said body to provide an internal chamber whose surface is a negative of said body, desolidifying said body to remove it from said internal chamber of said mold, spraying an electrically conductive paint onto the inside contoured surface of said mold in a uniform layer to a thickness less than one half of said predetermined size of said particles, said electrically conductive paint containing, to impart conductivity, a material having an electrical resistance substantially as low as silver and being substantially as resistant to corrosion as silver, causing abrasive particles to be embedded through said paint to said inside contoured surface of said mold while said paint is tacky, removing excess abrasive particles from said internal chamber of said mold, drying said paint, electrodepositing metal onto said paint and around and covering said abrasive particles to form an electrodeposited metal layer which supports the abrasive particles, filling said internal chamber of said mold with a solidifiable material which supports said electrodeposited metal layer and abrasive particles to form a solid rotatable dresser, and removing said solid rotatable dresser from said mold, to provide a dresser which when revolved against the revolving surface of a grinding wheel contours its surface to the desired contour of said master grinding wheel.

References Cited

UNITED STATES PATENTS

| | | | |
|---|---|---|---|
| 2,317,008 | 4/1943 | Werner | 18—55.1 |
| 2,327,762 | 8/1943 | Bull | 204—6 |
| 2,370,970 | 3/1945 | Keeleric | 204—3 |
| 2,858,256 | 10/1958 | Fahnoe et al. | 204—4 |
| 3,211,634 | 10/1965 | Lorenzo | 204—16 |

JOHN H. MACK, *Primary Examiner.*

W. VAN SISE, *Assistant Examiner.*

U.S. Cl. X.R.

204—3, 4, 69